United States Patent [19]
Van Gilst

[11] 3,788,280
[45] Jan. 29, 1974

[54] ANIMAL ENCLOSURE AND GATE THEREFOR

[75] Inventor: Carl Van Gilst, Goshen, Ind.

[73] Assignee: Bangor Punta Operation, Inc., Greenwich, Conn.

[22] Filed: Sept. 15, 1972

[21] Appl. No.: 289,495

[52] U.S. Cl............. 119/99, 280/43.17, 280/43.24, 292/306
[51] Int. Cl............................................. A61d 3/00
[58] Field of Search.. 119/98, 99; 280/43.17, 43.24; 292/306

[56] References Cited
UNITED STATES PATENTS

| | | | |
|---|---|---|---|
| 619,196 | 2/1899 | Mahannah et al. | 119/99 |
| 581,175 | 4/1897 | Runnells et al. | 119/99 |
| 1,069,429 | 8/1913 | Jackson et al. | 292/306 X |
| 2,703,554 | 3/1955 | Haggard et al. | 119/99 |
| 2,595,781 | 5/1952 | Durham | 280/43.24 X |
| 3,161,176 | 12/1964 | Derry | 119/99 |
| 2,895,451 | 7/1959 | Smith | 119/99 |
| 3,014,456 | 12/1961 | Shawk | 119/99 |

FOREIGN PATENTS OR APPLICATIONS

| | | | |
|---|---|---|---|
| 257,277 | 3/1964 | Australia | 119/99 |
| 509,699 | 3/1956 | Germany | 280/43.24 |
| 837,970 | 6/1960 | Great Britain | 119/99 |

*Primary Examiner*—Antonio F. Guida
*Assistant Examiner*—J. A. Oliff

[57] ABSTRACT

The enclosure includes bottom and upstanding side walls with the gate at one end, one of the side walls having a pivoted panel forming a door for access within the enclosure. Wheels are carried by the enclosure and are pivotable between a first position rendering the enclosure transportable and a second out-of-the-way position rendering it immobile. The gate includes a pair of upstanding animal restraining members movable toward and away from one another by pantographic linkages connected to the side frames of the gate, the members being bowed outwardly intermediate their lengths. A lever is pivotably connected to the frame and to like ends of a pair of links which are in turn pivotably connected at their opposite ends to the restraining members. Swinging movement of the lever in opposite directions operates to move the members toward and away from one another whereby the members can be spaced selected distances one from the other. An upstanding arcuate rod is mounted on one side of the frame. The operating lever carries a locking bar which releasably frictionally engages the rod whereby the locking lever can be locked in selected positions thereby locating the members at a selected distance one from the other and also locking the members from movement in a direction away from one another.

6 Claims, 4 Drawing Figures

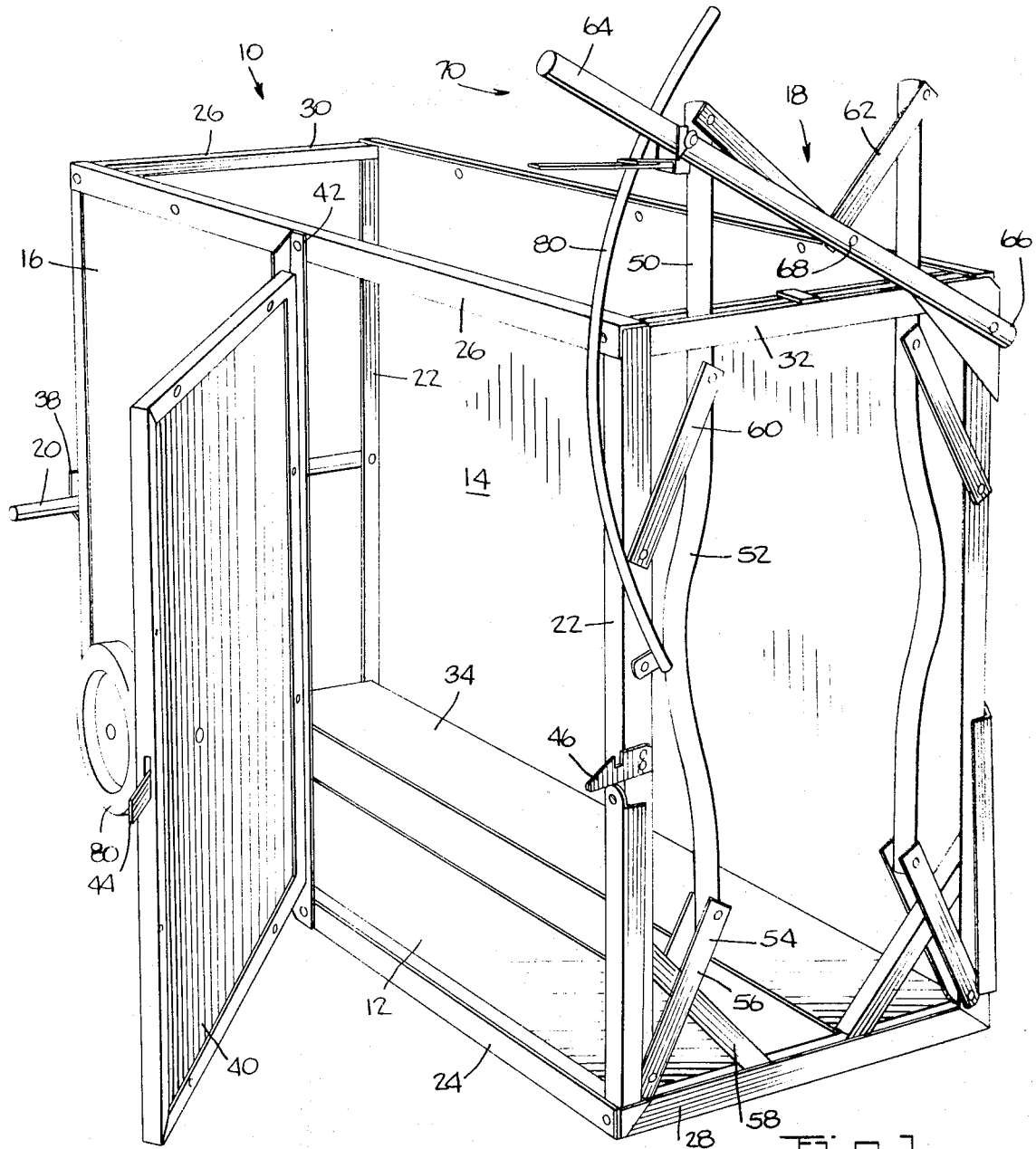

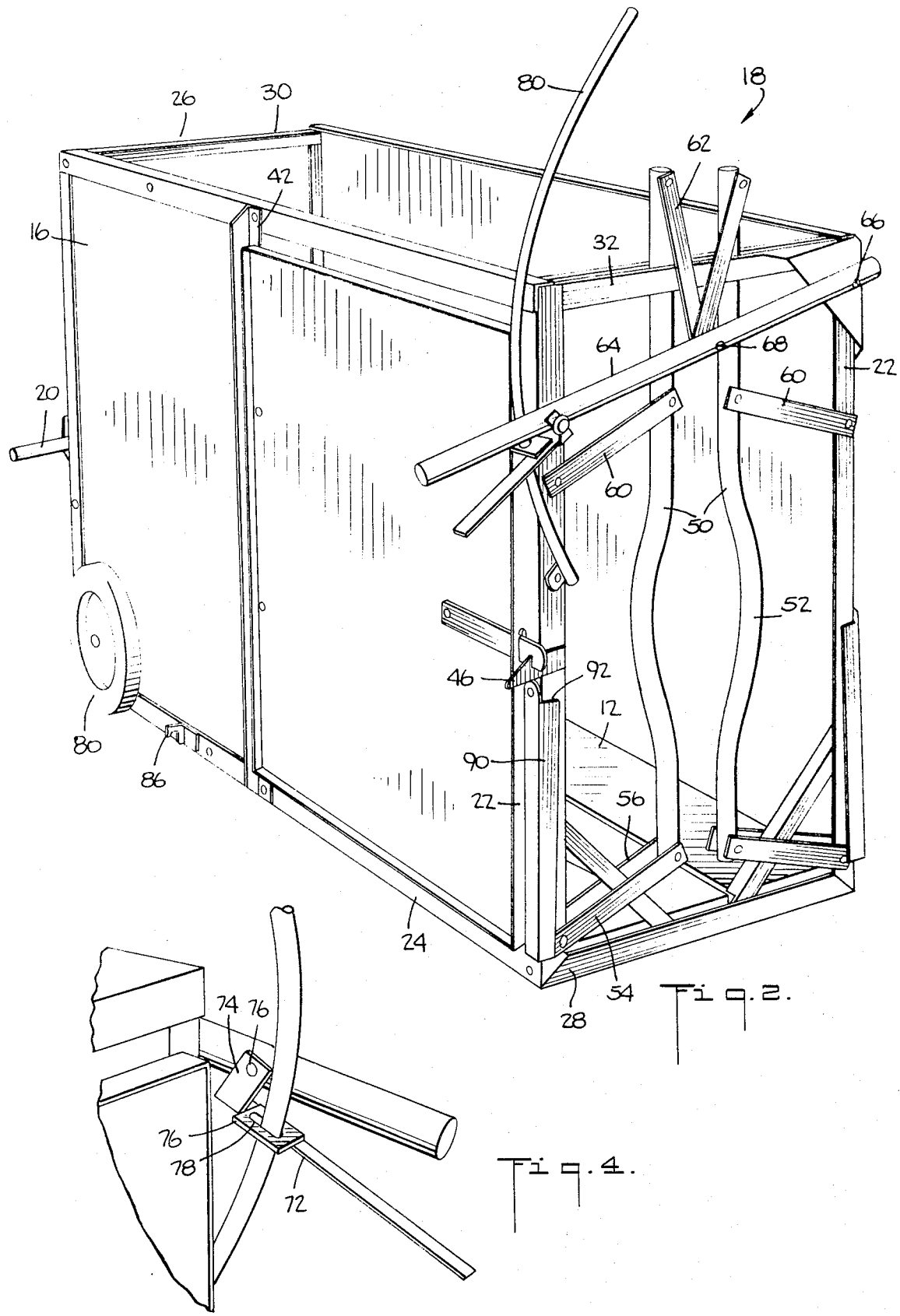

ANIMAL ENCLOSURE AND GATE THEREFOR

The present invention relates to an animal enclosure and gate therefor and particularly relates to a transportable animal holding crate or chute having a gate for restraining the animal within the crate, the gate being adjustable to accomodate and restrain animals of various sizes.

A multiplicity of animal holding or restraining devices have been proposed and constructed in the past. For example, U. S. Pat. Nos. 3,037,482; 2,678,631; and 3,299,856 disclose animal holding pens having gates which include members engagable about the neck of the animal to restrain the same within the enclosure. The first two of the above-mentioned patents employ articulated linkages for moving the restraining members toward and away from the animal. U. S. Pat. No. 3,161,176 discloses a further form of gate using articulated pantographic linkages for moving vertically extending restraining jaws toward and away from the animal's neck. It has been found however that many such devices are cumbersome in nature, i.e., to the extent of having a large number of variously moving linkages and parts, are often expensive to construct, and have not generally been adopted by the industry. Moreover, the devices disclosed in the aforementioned patents are somewhat difficult to operate as they require manipulation of two levers to move the restraining members about the animal's neck and to lock the same in place respectively. Furthermore, the gates disclosed in such patents have not been effectively integrated with a low cost readily transportable enclosure and one which also provides for quick and easy access to and from the enclosure.

The present invention provides an animal enclosure and gate therefor which minimizes and/or eliminates the foregoing and other problems and disadvantages associated with prior animal enclosures and gates and provides a novel and improved animal enclosure and gate therefor which has various advantages in construction, operation and use in comparison with such prior devices. Particularly, the present invention provides an enclosure having a bottom wall and upstanding side walls with a gate at one end. The opposite end of the enclosure is closed by a bar pivotable out of the way whereby such opposite enclosure end can be fully opened to provide ready access to the enclosure. To provide access from the enclosure, one of the side walls has a panel pivotally connected to the side wall frame, the panel constituting an outwardly opening door adjacent the end of the enclosure carrying the gate. Consequently, the end of the enclosure remote from the gate can be fully opened simply by raising a pivoted bar thereby providing full access to the enclosure and also permitting the animal to be led forwardly toward the gate. The side door permits the animal to move from within the enclosure directly after its head is withdrawn from the gate.

Further, the gate hereof readily accommodates animals of various sizes, is of simple and economic construction and is readily and easily operated to effectively restrain the animal in the enclosure. To these ends, the gate includes a pair of upstanding animal restraining members which are bowed outwardly one from the other intermediate their ends to straddle the neck of the animal. The restraining members are connected to the enclosure frame by pantographic linkages which provide for simultaneous movement of the members toward and away from and in substantially constant parallelism with one another. An operating lever is pivotally connected to the side frame and to like ends of a pair of links which are pivotally connected at opposite ends to the restraining members. Swinging movement of the lever in opposite directions thus respectively moves the restraining members toward and away from one another. It is a related feature hereof that the operating lever can be locked against swinging movement in a direction tending to move the restraining members away from one another without further manipulation of the lever or of any part. That is, once the lever is swung downwardly to move the restraining members about the animal's neck, no further manipulation is required as the lever is automatically locked in a position preventing the members from moving away from one another. To this end, the lever freely pivotally carries a locking bar which in turn is received about an upstanding arcuate rod secured to the side frame. The bar frictionally engages the rod and prevents swinging movement thereof in an upward direction and hence movement of the restraining members away from one another. To release the animal's neck, the bar is simply squeezed toward the operating lever and is thereby released from frictional engagement with the arcuate rod permitting the operating lever to swing in a direction permitting movement of the restraining members away from one another.

It is a further feature hereof that the enclosure can be readily rendered transportable from a substantially immobile position. To this end, wheels mounted on brackets which in turn are pivotally coupled to the enclosure are pivotable between a position with portions of the wheels projecting below the enclosure thereby rendering it transportable and a position with the wheels raised along the sides of the enclosure thereby permitting the bottom wall of the enclosure to rest on the ground.

Accordingly, it is a primary object of the present invention to provide a novel and improved animal enclosure and gate therefor.

It is another object of the present invention to provide a novel and improved animal enclosure and gate therefor configured to permit efficient handling and movement of the animal into the enclosure, into the restrained position in the gate, and out of the enclosure.

It is another object of the present invention to provide a novel and improved enclosure and gate therefor wherein the gate members which restrain the animal within the enclosure are readily and easily moved into a restraining position and automatically locked from movement out of such position without manipulation of any other parts of the device.

It is a further object of the present invention to provide a novel and improved enclosure and gate therefor which can be readily rendered immobile or transportable as desired.

It is a still further object of the present invention to provide a novel and improved animal enclosure and gate therefor wherein animals of various sizes can be accommodated within the enclosure and restrained within the gate.

It is a related object of the present invention to provide a novel and improved animal enclosure and gate therefor which is readily, easily and inexpensively constructed, stury, light in weight, and simple in operation and use.

These and further objects and advantages of the present invention will become more apparent upon reference to the following specification, appended claims and drawings wherein:

FIG. 1 is a perspective view of an animal enclosure and gate therefor constructed in accordance with the present invention illustrating the gate and the side door panel in their open positions;

FIG. 2 is a view similar to FIG. 1 illustrating the gate and side door in a closed position;

FIG. 3 is a fragmentary perspective view of a lower portion of the enclosure illustrating its wheels and mountings therefor; and FIG. 4 is a fragmentary perspective view illustrating a device for automatically locking the operating lever in a position preventing the restraining members from movement away from one another and hence preventing release of the animal restrained thereby.

Referring now to the drawings, particularly to FIG. 1, there is illustrated an animal enclosure, generally indicated 10, comprised of a bottom wall 12, side walls 14 and 16, a gate generally indicated 18 at one end of enclosure 10 and a restraining bar 20 at the open opposite end of the enclosure. Enclosure 10 is further comprised of a framework formed primarily of angle members and including side frames formed by corner uprights 22 connected at their lower and upper ends by longitudinally extending supports 24 and 26 respectively. Transversely extending supports 28 connect the side frames one to the other at the lower ends of uprights 22 and a transversely extending support 30 interconnects the upper ends of the uprights 22 at the end of the enclosure remote from gate 18. For reasons noted hereinafter, the uprights 22 at the gate end of the enclosure are interconnected at their upper ends by a pair of longitudinally spaced plates 32. For supporting the animal within the enclosure, the bottom wall 12 is preferably provided with planking 34 although any other suitable flooring may be provided. The side frames are preferably enclosed by lightweight sheet metal although again other suitable materials such as stretched open mesh metal screen could be utilized. Restraining bar 20 is pivotably connected at 36 to one of the rear uprights 22 and is received within an open slot formed by a generally Z-shaped plate 38 secured to upright 22 on the other side of the enclosure. It will be appreciated that the bar is pivotable to an upright position to open that end of the enclosure whereby ready access to the enclosure is provided. The bar 20 in its illustrated horizontal position prevents egress of the animal from the enclosure.

One of the side walls 16 is provided with a movable panel 40 which serves as an exit for the animal from enclosure 10. Particularly panel 40 extends between the lower and upper longitudinal supports 24 and 26 respectively and is hinged to a vertically extending support 42 secured at opposite ends to supports 24 and 26. A pivotal locking lever 44 is carried by the door and cooperates with a notched lug 46 secured to an upright 22 whereby the door can be maintained in a locked position as illustrated in FIG. 2. As appreciated from the drawings, the door 40 is located adjacent the gate end of the enclosure and this facilitates egress of the animal from the enclosure.

Referring back to FIG. 1, the gate 18 includes a pair of generally upstanding restraining members 50 having laterally outwardly bowed portions 52 for engaging the animal's neck. Restraining members 50 are received between plates 32 and are each pivotably connected to a corner upright 22 by a pantographic linkage. Particularly, each restraining member 50 is pivotably connected at its lower end to one end of a first linkage 54. Linkage 54 comprises a pair of spaced links 56 pivotably connected at their lower ends to upright 22 and which links 56 straddle a diagonal support brace 58 interconnecting transverse support 26 and upright 22. By locating members 50 between plates 32 at the upper end of gate 18 and providing links 56 in straddling relation to diagonal braces 58 at the lower end of gate 18, the restraining members are effectively constrained from movement out of the plane of the gate frame comprised of uprights 22, lower support 26, and upper plates 32. A second linkage comprised of a single link 60 pivotably connects each restraining member 50 and the upper portion of upright 22 to complete the pantographic linkage connection between the members and the enclosure.

To provide conjoint movement of the restraining members 50 toward and away from one another, the upper ends of members 50 are connected one to the other by a pair of links 62. Particularly, links 62 are pivotably connected to the upper ends of members 50 above plates 32 and to one another at their opposite ends, the latter pivotable connection being located below the upper ends of members 50. An operating lever 64 is pivotably connected at 66 to an upright 22 and also pivotably connected at 68 to the pivotable connection between links 62. It will thus be appreciated that movement of operating lever 64 about its axis 66 in a downward direction will cause restraining members 52 to move simultaneously toward one another, i.e., from the position illustrated in FIG. 1 to the position illustrated in FIG. 2. Conversely, movement of lever 64 about axis 66 in the upward direction moves members 50 away from one another, i.e., from the position illustrated in FIG. 2 to the position illustrated in FIG. 1.

In order to prevent members 50 from being moved away from one another by the animal when constrained therebetween, a locking mechanism generally indicated 70 is provided. Particularly mechanism 70 includes, as best illustrated in FIG. 4, a locking bar 72 having upturned end flanges 74 pivotably connected at 76 to the locking lever 64, bar 72 being thereby freely pivotably carried by lever 64. The locking bar 72 carries a laterally projecting plate 76 having a slot 78. An arcuate rod 80 is secured at its lower end to an upright 22 and upstands along one side of the enclosure at the gate end thereof. Rod 80 extends along an arc having axis 66 as its center. Rod 80 is also received within slot 78 in plate 76. As illustrated, the pivotable axis 76 of locking bar 72 is located on locking lever 64 between axis 66 and rod 80. Since bar 72 is freely pivotably mounted on lever 64, the margins of slot 78 will, by gravity, frictionally engage rod 80. Consequently, any tendency of the locking lever 64 to move in an upward direction, will cause and be resisted by frictional engagement between the locking plate 76 and rod 80. By pivoting the end of locking bar 72 toward locking lever 64, it is possible to align slot 78 such that rod 80 is freely receivable therein thereby rendering lever 64 free for pivotal movement.

Accordingly, by raising lever 64, members 50 are simultaneously moved away from one another whereby the head of an animal led into enclosure 10 can be disposed between the bowed portions 52 of members 50. By swinging lever 64 downwardly, members 50 are moved toward one another to clamp about the animal's neck thereby constraining the animal between members 50. Upon release of lever 64, members 50 cannot thereafter be moved away from one another by the animal as the frictional engagement between plate 76 and rod 80 prevents upward movement of locking lever 64. It is a significant feature hereof that the foregoing locking action is accomplished automatically and without any manipulation of the parts of the gate. To release the animal, locking bar 72 is squeezed toward lever 64 thereby releasing locking lever 64 for pivoting movement about its axis 66 in an upward direction. That is, by squeezing bar 72 toward lever 64, plate 76 is pivoted out of frictional engagement with rod 80 thereby freeing lever 64 for swinging movement.

A pair of wheels 80 are provided at one end of enclosure 10. Particularly, each wheel 80 is mounted on a bracket 82 which in turn is pivotably connected at 84 to the lower frame member 24. The bracket 82 is sprung away from lower frame member 24 and, at its end remote from pivotable connection 84, is receivable within a downwardly opening slot 86 formed in a lug 88 also secured to frame member 24. It will be appreciated that the engagement of bracket 82 in slot 86 of lug 88 as illustrated in FIG. 3 locates a portion of the wheel 80 below the bottom wall 12 of enclosure 10 whereby the entire enclosure is adapted for transport. By pivoting the bracket 82 out of slot 86 and springing it outwardly, the wheel can be pivoted about axis 84 upwardly above the bottom wall 12 whereby the entire enclosure 10 rests on the ground in an immobile position. To facilitate wheeled transport of the enclosure, a pair of handles 90 are pivotably connected at their upper ends to uprights 22 at the gate end of the enclosure remote from wheels 80. Handles 90 comprise angles, the upper edges 92 of which bear against uprights 22 when the handles are rotated into their operative generally horizontal position. Thus, the enclosure is transportable on wheels 80 similarly as a wheelbarrow.

From the foregoing description, it will be appreciated that the objects of the present invention are fully accomplished in that there is provided a novel and improved enclosure for animals and gate therefor having the variously noted advantages in construction, mode of operation and use in comparison with prior enclosures and gates. Particularly, the structure is readily, easily and economically fabricated and from lightweight materials. The restraining members are easily operated by one hand and are automatically locked against movement away from one another. The restraining members 50 are further locked against movement away from one another in variously relatively spaced positions whereby animals of different sizes can be effectively restrained. By virtue of the end and side door openings, ready access to and from the enclosure is provided. While the enclosure and gate therefor has been described herein in connection with animals in general, it has particular application and use as an enclosure and gate for hogs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A gate for an animal holding enclosure comprising a generally rectilinear frame, a pair of generally upstanding animal restraining members, each restraining member having laterally outwardly bowed portions intermediate its ends which cooperate for engaging an animal's neck, means carried by said frame mounting said members for conjoint movement toward and away from one another, said mounting means including a pantographic linkage connecting said members to the opposite sides of said frame, means for moving said members downwardly and inwardly as well as upwardly and outwardly with respect to one another including a pair of links pivotally coupled to one another at like ends and at opposite ends to said members, respectively, said moving means including a lever pivotally connected to said frame and to said like ends of said links at a location spaced from its pivotal connection with said frame whereby pivotal movement of said lever in one direction relative to said frame articulates said links to move said members downwardly and inwardly toward one another and pivotal movement of said lever in the opposite direction relative to said frame articulates said links to move the members upwardly and outwardly from one another, and, an arcuate rod carried by said frame, said rod being upstanding along the side of said frame opposite the pivotable mounting of said lever and extending along an arc having an axis substantially coincident with the axis of rotation of said lever about said pivotable mounting, and a locking bar pivotally carried by said lever and frictionally engageable with said rod to prevent movement of said lever in said opposite direction.

2. An animal enclosure having a gate according to claim 1, including a bottom wall and a pair of side walls upstanding from the opposite edges of said bottom wall, said gate being disposed at one end of said enclosure whereby an animal can be disposed within said enclosure on said bottom wall with its head constrained between said members, and means adjacent the opposite end of said enclosure and extending between said side walls for closing the opposite enclosure end.

3. An enclosure according to claim 2, wherein one of said side walls includes a panel, means for mounting said panel for swinging movement outwardly of said enclosure and thereby to provide an opening into said enclosure through said one side wall.

4. An enclosure according to claim 2, including a pair of brackets pivotably carried by said enclosure adjacent the bottom wall thereof and pivotable between first and second positions, a pair of wheels pivotably carried by said brackets, said brackets in said first position locating a portion of said wheels below said bottom wall wherein said enclosure is transportable on said wheels, said brackets being movable to a second position whereby said wheels are located above said bottom wall, and means for releasably locking said brackets in said first position.

5. An enclosure according to claim 4, wherein said wheels are located adjacent one end of said enclosure, a pair of handles pivotally connected at one end to said enclosure at its opposite end and movable between first and second positions, said handles in said first position depending vertically from enclosure and in said second position extending substantially horizontally whereby said enclosure is transportable by said handles and wheels.

6. A gate according to claim 1, wherein said pantographic linkage includes a pair of links pivotably connecting each of said members to said frame adjacent the lower and intermediate portions of said members respectively, said members extending above said frame with said first mentioned links being pivotably connected to said members adjacent the upper ends thereof.

* * * * *